3,527,717
ISOMERIZING CATALYSTS AND METHOD FOR PREPARING AND USING SAME

Joseph P. Giannetti, Allison Park, and Raynor T. Sebulsky, Verona, Pa., assignors to Gulf Research & Development Company, Pittsburgh, Pa., a corporation of Delaware
No Drawing. Filed Dec. 23, 1966, Ser. No. 604,180
Int. Cl. B01j 11/78
U.S. Cl. 252—442                        9 Claims

ABSTRACT OF THE DISCLOSURE

Low temperature isomerization catalyst compositions are prepared by treating a catalyst comprising alumina and a metalliferous material having hydrogenating activity with methylchloroform. The methylchloroform-activated catalyst compositions may be pretreated and/or post treated with hydrogen chloride to increase activation thereof.

BACKGROUND OF THE INVENTION

In copending application Ser. No. 561,710 filed in the U.S. Patent Office on June 30, 1966, now U.S. Pat. No. 3,419,503 in the name of Joseph P. Giannetti et al., there is disclosed and claimed a method of activating composite catalytic materials comprising alumina and a metalliferous hydrogenating component by a treatment which includes activation with a carbon chloride having the general formula

wherein X and Y may each be a monovalent radical of either hydrogen, halogen or SCl, or where X and Y taken together may be divalent oxygen or sulfur. Included under this formula is carbon tetrachloride, chloroform ($CHCl_3$), methylene chloride ($CH_2Cl_2$), dichlorodifluoromethane ($CCl_2F_2$), trichlorobromomethane ($CCl_3Br$), thiocarbonyltetrachloride ($CCl_3SCl$), trichlorofluoromethane ($CCl_3F$), dichlorodibromomethane ($CCl_2Br_2$), and dichlorobromofluoromethane ($CCl_2BrF$), these carbon chlorides are compounds having only one carbon atom and at least two chlorine atoms per molecule. It has been previously considered that compounds having more than one carbon atom per molecule are either unsatisfactory for such purposes, or if a compound having more than one carbon atom per molecule is employed, the atomic ratio of chlorine to carbon should be at least 2 to 1.

SUMMARY OF THE INVENTION

It has now been found that composite catalytic materials comprising alumina and a metalliferous hydrogenating component may be activated by the normally liquid chlorine-containing compound, methylchloroform (1,1,1-trichloroethane). Surprisingly, it has been discovered that compositions such as platinum on alumina, which have virtually no activity for the low temperature isomerization of isomerizable hydrocarbons may be transformed into highly active isomerization catalysts by activation with methylchloroform has more than one carbon atom per molecule and contains chlorine in a chlorine to carbon atomic ratio of less than 2 to 1, namely 3 to 2.

The use of methylchloroform as an activating agent in the production of low temperature isomerization catalysts has many attendant advantages. Methylchloroform not only yields an active catalyst, but it is relatively inexpensive and has a low toxicity index which enables it to be safely and easily handled.

The activity of the methylchloroform activated catalysts may be further enhanced by preceding and/or following the methylchloroform activation step by a treatment with hydrogen chloride.

In accordance with the present invention, a composite catalytic material comprising a major proportion of alumina and containing a minor proportion of a metalliferous material having hydrogenating activity, such as platinum metal, is activated for the isomerization of hydrocarbons by contacting the catalytic material with methylchloroform under nonreducing conditions at an elevated temperature in the range of between about 700° and about 1100° F., preferably between about 800° and about 1000° F., that is effective to promote a substantial increase in the chlorine content of the composite catalyst.

The methylchloroform treatment of the catalyst base is carried out under nonreducing conditions effective to promote a substantial increase in the chlorine content of the catalyst base. The use of nonreducing conditions is important as reducing conditions may lead to formation of hydrogen chlorine, which in turn will reduce the effective amount of chlorine available to combine with the catalyst base and thereby reduce the catalyst activity. The nonreducing conditions can be achieved merely by exclusion from the reaction zone of materials other than the catalyst base and the methylchloroform. Alternatively, the methylchloroform can be contacted with the catalyst base, together with an inert carrier gas such as nitrogen, or with an oxidizing gas such as air or oxygen. Likewise, the catalyst may be contacted with an inert carrier gas subsequent to the methylchloroform activation.

By "nonreducing conditions" is meant merely essentially nonreducing conditions. Accordingly, conditions under which a small proportion of a reducing component such as hydrogen is present are not intended to be excluded. The catalyst base may be contacted with the methylchloroform in any proportions and under any conditions sufficient to significantly increase the chlorine content of the catalyst base. Proportions sufficient to increase the chlorine content of the catalyst base by about 1 percent under the reaction conditions employed will produce an appreciable improvement in the activity of the catalyst, but it is preferred to utilize larger proportions sufficient to increase the chlorine content of the catalyst by at least about 1.5 and preferably up to about 8 percent by weight. However, still larger proportions can be used: for example, there can be used amounts sufficient to yield up to 10 to 12 percent chlorine in the catalyst base without undue difficulties. Within the limits indicated, the use of methylchloroform in weight ratios of from about 0.02 to about 2.0, and preferably from about 0.05 to about 1 wih respect to the catalyst base, are effective at the conditions disclosed herein to achieve the desired results.

The methylchloroform, or the thermal decomposition products thereof, or a mixture of both, interacts with the catalyst base at elevated temperatures. Very active catalysts are obtained when using treating temperatures in the range of from about 800° to about 1000° F., but higher or lower temperatures that are effective to increase the chlorine content of the catalyst and to reduce the oxygen content thereof can be used. For example, temperatures as low as about 700° F. are effective to promote the desired interaction. The treating temperature should not exceed about 1100° F. to avoid unnecessarily reducing the amount of chlorine combined with the catalyst base. Within the temperature ranges disclosed, contact times of from about 15 minutes to about 5 hours, preferably from about 0.5 to about 3 hours, are effective to increase the chlorine content of the catalyst base to a satisfactory level for purposes of this invention.

It is presumed that the chlorine portion of the methylchloroform interacts chemically in some not fully understood way with the catalyst base. Available evidence indicates that the nature of the reaction is unique, as catalysts prepared in the manner disclosed herein are markedly superior to comparable catalysts in which the chlorine content of the catalyst is increased, for example, by treatment with vaporous aluminum chloride.

While it is not intended to limit this invention to any particular theory, the following general reactions appear to take place:

(a)

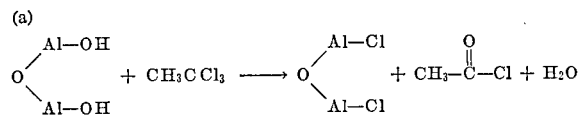

(b) Formation of a Pt-Cl-Al complex.

Thus, it will be seen that in the course of the herein-disclosed activation, the chlorine content of the catalyst is increased, and the oxygen content is reduced, the carbonaceous portion of the methylchloroform acting as an oxygen-acceptor.

Composite catalytic materials that have been activated in the manner indicated above are highly effective as low temperature isomerization catalysts for paraffinic hydrocarbons, but especially advantageous results may be obtained when the activating treatment is preceded and/or followed by a further activating treatment with hydrogen chloride.

The hydrogen chloride pretreatment of the composite catalytic material may be carried out under any conditions which are effective to remove at least a portion of the water not previously removed during calcining and drying of the composite material and that will not adversely affect the catalytic activity of the catalyst by fusion. Temperatures in the range of from about 950° to 1250° F., preferably from about 1000° to about 1100° F., are normally effective for this purpose. Temperatures significantly less than about 950° F. should not be used for purposes of the present invention, since such both lower temperatures are relatively less effective to enhance the susceptibility of the catalyst base to activation with methylchloroform. The water which is removed during the pretreatment can be physically adsorbed water, chemically or pseudochemically bound water, such as water of hydration or water formed by the reaction of hydroxyl groups present on the surface of the alumina.

The hydrogen chloride employed in the pretreating step may be used in any proportion with respect to the composite catalytic material that is effective to increase the chlorine content of such material, as even a small increase in the chlorine content of such material obtained in this fashion will effectively increase the isomerization catalytic activity obtainable by the subsequent treatment with methylchloroform.

It is preferred to employ hydrogen chloride in substantial excess of the amount that is capable of combining with the composite catalytic material at the reaction conditions employed. Excellent results are obtainable by the use of hydrogen chloride in proportions of from about 0.05 to about 1:1 by weight with repsect to the catalyst, but larger or smaller proportions can also be used with good results. The action of the hydrogen chloride upon the composite catalytic material takes place easily at atmospheric pressures, and elevated pressures are not necessary, although such pressures may be used if desired.

The hydrogen chloride pretreatment described above can be carried out for as little as a few minutes, since some hydrogen chloride can combine with the catalyst even when only a small amount of water is removed from the composite catalytic material, but it is preferred to continue the hydrogen chloride treatment until no further evolution of water can be observed and until no further combination of hydrogen chloride with the catalyst is obtained at the reaction conditions selected. Normally this point will have been reached before about 3 hours at the temperatures indicated, and no further advantage is obtained by longer periods of the hydrogen chloride treatment, although the pretreatment has been successfully carried out for as long as 6 hours.

The hydrogen chloride utilized in the pretreating operation need not be pure and may contain other materials that do not adversely affect the isomerization activity of the finished catalyst. In fact, it is preferred to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but may be introduced in the form of a hydrogen chloride precursor, such as propyl chloride, t-butyl chloride or other chlorine-substituted aliphatic hydrocarbon, when hydrogen is used as the diluent gas.

The hydrogen chloride aftertreatment may be carried out at any conditions that will not significantly reduce the chlorine content of the previously activated catalyst. Temperatures in the range of from about 60° to about 900° F., can be used. While some effect of the hydrogen chloride aftertreatment may be noted at temperatures below about 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts can be used. By way of illustration, excellent results are obtainable by the use of hydrogen chloride in proportions of about 0.05 to 1:1 by weight with respect to the activated catalyst.

Similarly, as in the case of the hydrogen chloride pretreatment, the hydrogen chloride aftertreatment can be carried out at ambient atmospheric pressures, and elevated pressures are not necessary, although such pressures can be used. Also as in the case of the hydrogen chloride pretreatment, the contact with hydrogen chloride can be effected over a period of a few minutes to several hours with good results. If desired, the hydrogen chloride aftertreatment can be carried out before or during contact of the catalyst with a hydrocarbon feed to be isomerized. No significant additional advantages are observed from carrying out the hydrogen chloride aftertreatment beyond 3 hours, although longer treating periods can be used successfully.

Further, as in the case of the hydrogen chloride pretreatment, the hydrogen chloride need not be pure and may contain as a diluent in any proportion hydrogen gas or inert diluent gases such as nitrogen and the like. By way of illustration, good results are obtainable when hydrogen is employed in proportions of from about 1:1 to about 10:1 by volume with respect to the hydrogen chloride.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combinations of any of these can be used. Also there can be used the aluminas described in Pats. No. 3,188,174, No. 3,151,939 and No. 3,151,940, which aluminas are prepared by calcining an alumina hydrate containing 1.2 to 2.6 mols of water of hydration.

The alumina bases useful in the present invention can be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to 500 m.$^2$/g. or even more.

Especially advantageous results are obtainable when using aluminas having a surface area above about 250 m.$^2$/g. and more particularly, above 300 m.$^2$/g. although aluminas of lower surface area can be used. Presumably, the amount of chlorine that can be taken up during the methylchloroform treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metal-liferous component, having hydrogenating activity and selected from the lefthand column of Group VI or from Group VIII of Mendeleev's Periodic Table. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 to 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the alumina hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with methylchloroform, so as to minimize loss of the hydrogenating component by formation of volatile complexes during methylchloroform treatment. In the case of base metals such as nickel and tungsten, the hydrogenating component can remain in the form of a sulfide or oxide prior to the hydrogen chloride pretreatment and the methylchloroform activation treatment.

It is also important that the hydrogenating component be composited with the alumina base before the hydrogen chloride pretreatment and the methylchloroform activation treatment, as deposition thereafter normally will result in a reduction of the chlorine content of the methylchloroform treated base. This is undesirable, as the activity of the herein-disclosed catalyst appears to be generally related to the increase in chlorine content attributable to the methylchloroform activation treatment.

The catalyst base may contain halogen other than that incorporated by the methylchloroform treatment. For example, some halogen content may result from the use of an aluminum halide as a starting material to form the alumina base and/or some halogen may remain in the catalyst owing to the use of a halogen-noble metal acid. However, the halogen content from such sources as these does not appear to be equivalent, for purposes of this invention, to the halogen content resulting from the methylchloroform treatment.

Catalysts that have been activated by the activating processes described herein are useful in the low temperature isomerization of isomerizable saturated hydrocarbons, including not only straight-chain and slightly branched paraffins such as n-butane, n-pentane and n-hexane, but also cycloparaffins such as cyclopentane and cyclohexane and their corresponding methyl and dimethyl-substituted derivatives. These compounds need not be pure but can be mixed with other hydrocarbon materials as in the case of fractions obtained by fractional distillation of gasoline and naphtha cuts obtained from crude oils or reforming, for example. The process is especially advantageous for vapor phase isomerization of straight chain paraffin hydrocarbons containing 4 to 6 carbon atoms.

When the isomerization feed stock is derived from crude oil, the sulfur content may be so high as detrimentally to affect the catalyst. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stocks with the herein-disclosed catalysts is carried out at low temperatures in the range of from about 150° to about 450° F. in the presence of hydrogen gas at a pressure of from about atmospheric to about 2000 p.s.i.g., preferably from about 50 to about 1200 p.s.i.g., using a hydrogen:hydrocarbon mol ratio in the range of from about 0 to about 10:1, preferably from about 0.1 to about 5:1. Space velocities of from about 0.3 to about 10 and preferably from about 0.5 to about 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

The invention may be best understood by reference to the following specific examples which are illustrative only and are not intended to be limiting as to scope. All of the percentages indicated are by weight, unless otherwise specified.

Example 1

A commercial naphtha reforming catalyst in the amount of about 122 grams containing 0.6 percent platinum on an alumina base, having a typical chlorine content of 0.6 percent chlorine and a typical surface area of about 425 m.$^2$/g. is calcined at 550° F. overnight and at 900° F. for 2 hours. This catalyst is reduced in a stream of hydrogen at 900° F. for 2 hours. The hydrogen flow rate utilized is 1.5 standard cubic feet per hour. The reduced catalyst is purged over a period of 6 hours in a flow of prepurified nitrogen.

The temperature of the catalyst is then raised to 950° F. and the catalyst is subjected to a concurrent pretreatment with nitrogen at a flow rate of 0.57 standard cubic feet per hour and with 65 grams of methylchloroform over a period of one hour. Following the addition, the temperature was maintained at 950° F. for two additional hours with the nitrogen carrier. The resulting catalyst contains about 2.2 percent chlorine.

Example 2

The catalyst prepared by the method of Example 1 is tested for the conversion of normal hexane by charging 112 grams of the catalyst to a stirred autoclave along with 330 grams n-hexane. The autoclave is pressured to 300 p.s.i.g. with hydrogen and brought to 275° F. in about 3 hours. After 4 hours at 275° F. a sample is withdrawn.

Analysis of the product stream indicates that 15 percent by weight of the normal hexane is converted to isohexane.

Example 3

A reduced catalyst prepared by the method of Example 1, except that the methylchloroform activation is omitted, is placed in a reaction zone. A normal hexane feed is passed over this catalyst under the same conditions employed in the previous example.

A product analysis indicates that there is no conversion of normal hexane to isohexane.

The following example illustrates the use of the herein-disclosed hydrogen chloride pretreatment and post-treatments in combination with methylchloroform activation treatment.

Example 4

The commercial reforming catalyst of Example 1, in reduced form and in the amount of 170 ml. (125 grams) is brought to 1050° F. A hydrogen-hydrogen chloride mixture is passed over the catalyst for 3 hours at flow rates of 15 grams hydrogen chloride and 1.5 standard cubic feet of hydrogen per hour. The temperature is then reduced to 950° F. and nitrogen is passed over the catalyst for one hour at a flow rate of 0.57 s.c.f./hr. in admixture with a total of 65 grams of methylchloroform. At the conclusion of the addition, the temperature is reduced to 400° F. and hydrogen chloride is passed over the catalyst for 3 hours to produce an effective low temperature isomerization catalyst under the conditions of Example 2.

The following example illustrates the use of air as the nonreducing carrier gas during methylchloroform activation.

Example 5

The commercial catalyst of Example 1, in calcined form and in the amount of 122 grams, is brought to 950° F., and 65 grams of methylchloroform, in admixture with air at a flow rate of 0.57 s.c.f./hr., is passed over the catalyst in one hour. At the conclusion of the addition, the temperature is reduced to 560° F. in nitrogen. The catalyst temperature is held at this level for one hour in the presence of nitrogen and then cooled to room temperature. This catalyst is found to contain 3.4 percent chlorine and when tested under the conditions of Example 2, is found to produce 16 percent hexane isomers.

The following example demonstrates the importance of the activating temperature.

Example 6

The commercial reforming catalyst of Example 1, in reduced form and in the amount of 140 ml. (106 grams) is brought to 600° F., and 52 grams of methylchloroform, along with 0.5 s.c.f. nitrogen is passed over the catalyst in 4 hours. During the course of the treatment, the temperature of the catalyst was kept between 596° F. and 674° F. At the conclusion of the addition, the catalyst is kept at 650° F. for one additional hour with the nitrogen flow. The final catalyst contained 3.8 percent chlorine and resulted in no noticeable conversion at the conditions of Example 2.

Obviously, many modifications and variations of the invention as hereinabove set forth can be made without departing from the spirit and scope thereof, and therefore only such limitations should be imposed as are indicated in the appended claims.

We claim:

1. The method of activating a composite catalyst comprising a major portion of alumina and containing a minor proportion of a metalliferous material having hydrogenating and selected from the left-hand column of Group VI or from Group VIII of Mendeleev's Periodic Table, comprising contacting said composite material with methylchloroform, said contacting being carried out under non-reducing conditions at a temperature in the range of about 700° to 1100° F. that is effective to promote a substantial increase in the chlorine content of the said composite catalyst.

2. The method of claim 1 wherein the temperature is in the range of between about 800° F. and about 1000° F.

3. The method of claim 1 wherein the composite catalyst is contacted with a nitrogen-containing gas during the methylchloroform activation.

4. The method of claim 1 wherein the composite catalyst is contacted with a nitrogen-containing gas subsequent to the methylchloroform activation.

5. The method of claim 1 wherein the metalliferous material is platinum in reduced form.

6. The method of claim 1 wherein the composite catalyst is treated to improved its susceptibility to activation with the methylchloroform by contacting the same with hydrogen chloride at a temperature within the range of from about 950° to about 1250° F. prior to methylchloroform activation.

7. The method of claim 1 wherein the methylchloroform activated catalyst is subjected to a hydrogen chloride post treatment at a temperature within the range of from about 60° to about 900° F.

8. The method of claim 1 wherein the alumina has a surface area of more than about 250 square meters per gram.

9. The method of claim 7 wherein the hydrogen chloride for the post treatment is supplied with a hydrocarbon isomerization feed stock.

References Cited

UNITED STATES PATENTS

| | | | |
|---|---|---|---|
| 3,440,301 | 4/1969 | Lafferty | 260—683.68 |
| 3,235,617 | 2/1966 | Happel | 260—678 |
| 3,419,503 | 12/1968 | Giannetti | 252—441 |
| 3,322,689 | 5/1967 | Giannetti | 252—441 |
| 3,248,320 | 4/1966 | White | 208—136 |
| 3,253,055 | 5/1966 | Gobel | 260—683.75 |
| 2,642,384 | 6/1963 | Cox | 208—139 |

DANIEL E. WYMAN, Primary Examiner

P. M. FRENCH, Assistant Examiner

U.S. Cl. X.R.

260—683.68

UNITED STATES PATENT OFFICE
CERTIFICATE OF CORRECTION

Patent No. 3,527,717                               Dated September 8, 1970

Inventor(s)  Joseph P. Giannetti et al.

It is certified that error appears in the above-identified patent and that said Letters Patent are hereby corrected as shown below:

Column 1, line 64, after "methylchloroform" insert -- . This was totally unexpected since methylchloroform --. Column 3, line 36, after "composite" insert -- catalytic --; line 42, cancel "both"

Signed and sealed this 29th day of December 1970.

(SEAL)
Attest:

EDWARD M. FLETCHER, JR.                WILLIAM E. SCHUYLER, JR.
Attesting Officer                      Commissioner of Patents